(12) United States Patent
Bradley et al.

(10) Patent No.: US 8,177,970 B2
(45) Date of Patent: May 15, 2012

(54) WATER FILTRATION APPARATUS

(75) Inventors: Nigel Paul Thoresby Bradley, Woodthorpe (GB); Mark Hadley, Overseal (GB); Neil Dodsley, Newthorpe (GB)

(73) Assignee: Severn Trent Services, Limited, Tamworth (GB)

( * ) Notice: Subject to any disclaimer, the term of this patent is extended or adjusted under 35 U.S.C. 154(b) by 247 days.

(21) Appl. No.: 12/575,911

(22) Filed: Oct. 8, 2009

(65) Prior Publication Data

US 2010/0089810 A1    Apr. 15, 2010

Related U.S. Application Data

(60) Provisional application No. 61/145,608, filed on Jan. 19, 2009.

(30) Foreign Application Priority Data

Oct. 9, 2008 (GB) .................................. 0818511.8

(51) Int. Cl.
B01D 24/22 (2006.01)
(52) U.S. Cl. ........ 210/232; 210/274; 210/275; 210/293; 285/189; 285/363
(58) Field of Classification Search .................. 210/232, 210/274, 275, 291, 293; 285/21.1, 189, 295.1, 285/295.3, 363, 379
See application file for complete search history.

(56) References Cited

U.S. PATENT DOCUMENTS

| | | | |
|---|---|---|---|
| 4,133,766 A * | 1/1979 | Adie | 210/275 |
| 5,087,362 A | 2/1992 | Brown | |
| 5,108,627 A | 4/1992 | Berkebile et al. | |
| 5,160,613 A * | 11/1992 | Walter | 210/274 |
| 5,160,614 A | 11/1992 | Brown | |
| 5,328,608 A | 7/1994 | Bergmann et al. | |
| 6,312,611 B1 * | 11/2001 | Bergman et al. | 210/793 |
| 7,090,771 B2 * | 8/2006 | Dyson et al. | 210/263 |
| 2003/0006183 A1 | 1/2003 | Jackson et al. | |

OTHER PUBLICATIONS

Written Opinion PCT/GB2009051326, WIPO, Mar. 2010, International Searching Authority.

* cited by examiner

*Primary Examiner* — Matthew Savage
(74) *Attorney, Agent, or Firm* — D'Ambrosio & Menon, PLLC

(57) ABSTRACT

A water filtration apparatus has at least one tank in fluid communication with a conduit through at least one aperture in a wall. Each tank uses filter blocks to support the filter medium and to direct the filtered water to the conduit via the aperture. An end plate for the filter block is provided, the end plate being adapted to seal against a free end of the filter block. The end plate also provides apertures for fluid flow into and out of the filter block, and a device for receiving a sealant to provide a seal between the end plate and the wall. The end plate improves the installation of the apparatus, and the sealant improves the reliability of the seal round the apertures, which in turn improves the efficiency of a backwash operation used to clean the filter medium.

15 Claims, 2 Drawing Sheets

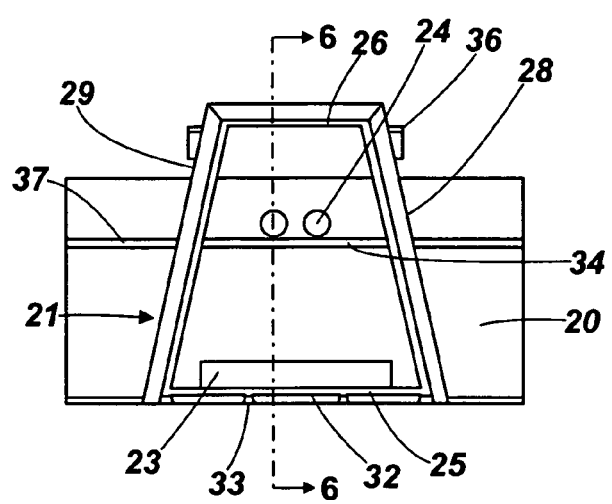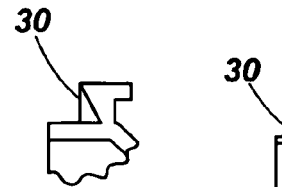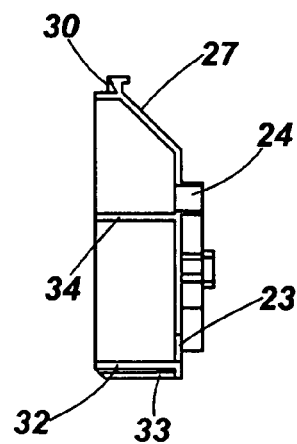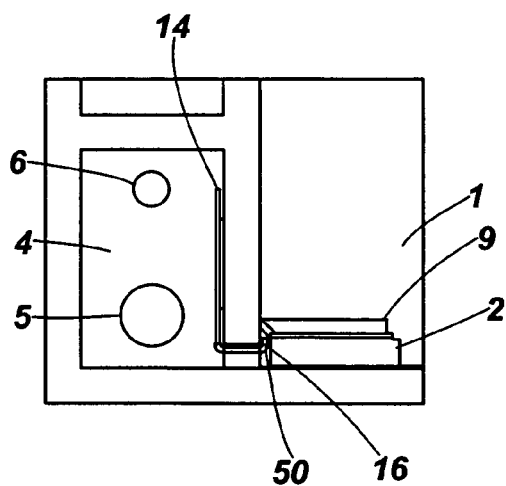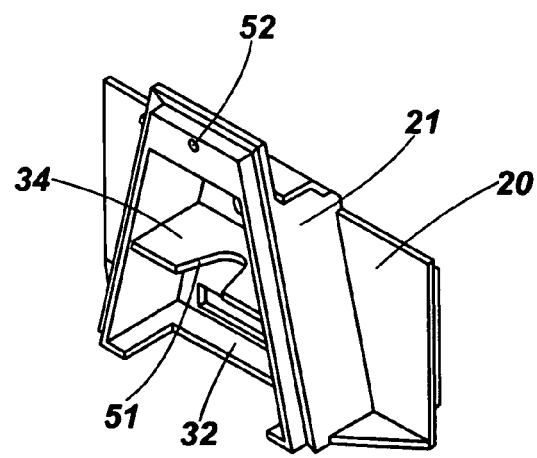

WATER FILTRATION APPARATUS

PRIORITY

This application is based on and claims the benefit of priority from GB 08118511.8, filed Oct. 9, 2008 and also from U.S. Provisional Patent Application Ser. No. 61/145,608 filed Jan. 19, 2009.

FIELD OF THE INVENTION

This invention relates to apparatus for water filtration, and in particular to apparatus using filter underdrain blocks

BACKGROUND

In known water filtration apparatus the water to be filtered is fed to a tank, and filters down under gravity through a filter medium, from where it is collected. An apparatus typically has several adjacent tanks, each connected to a main enclosed conduit, which collects the filtered water. The filter medium in each tank rests on underdrain blocks, with the filtered water passing through the blocks into the conduit. The blocks are arranged in rows, known as laterals, accommodated on the floor of a tank, and extending laterally away from the conduit. Each lateral is connected to the conduit through appropriate apertures in the tank wall to allow the filtered water to pass into the conduit, and also to allow reverse gas and liquid flow for a backwash operation which cleans the filter medium.

In a backwash operation the underdrain blocks provide the correct distribution of gas and liquid. A backwash operation typically first pumps gas (usually air) to the filter medium to release solids, then gas and liquid (usually water) concurrently, the gas to continue release of solids and the liquid to move them out of the filter medium, and lastly just the liquid to complete the removal of the solids. In order to ensure that the backwash operation is efficient, the correct amounts of gas and liquid should be provided to the blocks, and the block which is adjacent the apertures should seal against the tank wall to prevent leakage of gas.

SUMMARY

Currently, the blocks of a row are clipped together to form a lateral, which is installed in the tank by sliding down opposing tank walls onto a bed of grout. The ends of the end blocks are then sealed to the tank walls with more grout. The grouting of the end blocks does not reliably ensure the substantially gas-tight seal required for an efficient backwash operation, in particular, in the gas and concurrent gas/liquid phases. The installation process also tends to be time-consuming, as it may take a relatively long time for the grout to harden.

According to the present invention, we provide an end plate for a filter block of a water filtration apparatus having at least one tank in fluid communication with a conduit through at least one aperture in a wall, the end plate being adapted to seal against a free end of the filter block, the end plate also providing aperture means for fluid flow into and out of the filter block, and means for receiving a sealant to provide a seal between the end plate and the wall.

The invention improves the installation process, as the sealant-receiving means enables a relatively small amount of a mastic-type sealant to be used to seal the end plate to the wall, rather than a greater amount of grout. The use of less sealant also reduces the installation time. However, the arrangement of the sealant improves the reliability of the seal round the aperture means, thus reducing the possibility of gas leakage and improve the efficiency of a backwash operation. A further advantage is that the end plate accommodates slight variations in the positioning of the laterals, which may occur when the apertures in the conduit are formed.

The aperture means provides for gas and liquid flow into and out of the block, allowing filtered water to flow from the block to the conduit through the at least one aperture in the wall, and also allowing gas and liquid to pass from the conduit, through the at least one aperture in the wall, into the block during a backwash operation.

The end plate may have a primary member having a first side adapted to fit onto the end of a filter block. It may be welded to the block, or otherwise sealingly attached, as by an appropriate adhesive. The primary member preferably has the aperture means.

Conveniently, separate apertures are provided for the gas and the liquid. The sizes of the apertures will be chosen in accordance with the flow requirements, with the liquid aperture being below the gas aperture. In one embodiment, the liquid aperture may be a rectangular slot adjacent the base of the primary member. The gas aperture may be a pair of apertures adjacent the top of the primary member.

The sealant-receiving means may be provided on a secondary member projecting from the primary member on a second side opposite the first side. The secondary member has a different shape from the primary member, the arrangement being such that there is sufficient space to enable the sealant to be applied. The sealant-receiving means comprises a channel formed on the secondary member at its edge remote from the primary member. This enables the sealant to be applied accurately.

In one embodiment the secondary member is of trapezoidal outline, with the smaller parallel side at the top and the larger at the base. The sealant channel then is provided on the top and the two adjacent sides, thus ensuring a positive seal. The trapezoidal outline also tends to resist upthrust during the gas/liquid and liquid phases of a backwash operation.

The secondary member may also have a flange projecting above the primary member. The flange is adapted to engage the wall, and has an aperture enabling a mechanical fastener, such as a bolt, to be used to locate the end plate on the wall.

Conveniently the secondary member also includes a base plate, adapted to engage with a bed of grout on which the filter block is installed. The base plate acts as a baffle to protect the liquid apertures in the primary member from ingress of grout.

The secondary member may also have an intermediate plate forming a baffle separating the gas and liquid apertures on the primary member. In one embodiment the intermediate plate may have a cut-out to allow the end plate to slide over a gas pipe projecting through the wall. Grout grips may be provided on the base plate to ensure that the end plate engages properly with the bed of grout, and/or on the flange, for engagement with grout that may be required to seal round the tank walls.

BRIEF DESCRIPTION OF THE DRAWINGS

FIG. 5 is a side view corresponding to FIG. 4;
FIG. 6 is a section on the line 6-6 of FIG. 5:
FIG. 7 is a detail of part of FIG. 6;

FIG. 8 is similar to FIG. 2, but shows a modification; and

FIG. 9 is similar to FIG. 4, but shows a modified apparatus for use with the apparatus of FIG. 8.

DETAILED DESCRIPTION OF THE INVENTION

Figure 1:
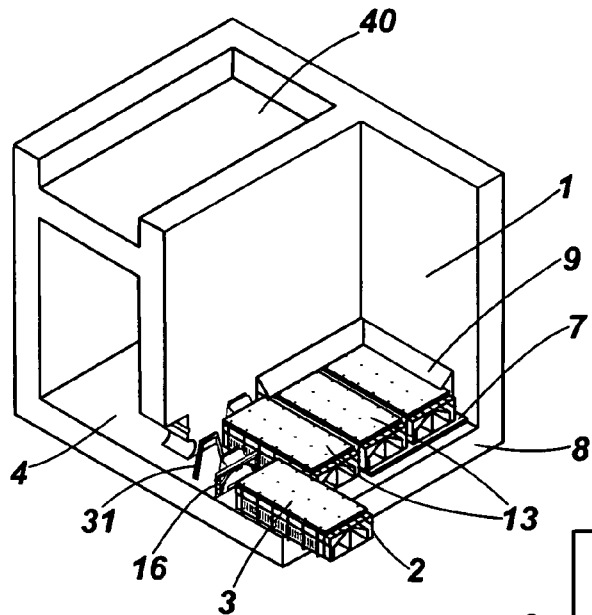
FIG. 1 shows a sectional exploded view of part of a water filtration apparatus.
Figure 2:
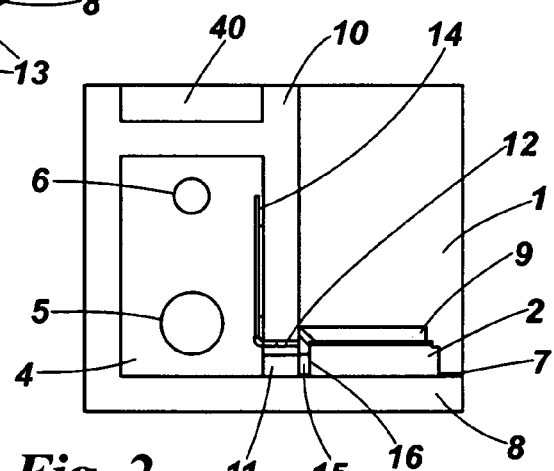
FIG. 2 shows an end view of the apparatus of FIG. 1.

FIGS. 1 and 2 show water filtration apparatus comprising a filter tank 1 (part only being shown) provided with underdrain blocks 2, on which rest filter media retention plates 3 and filter media (not shown) usually in the form of sand. The blocks 2 are located on a bed of grout 7 on the floor 8 of the tank 1, and are also grouted in at 9 round the edge of the tank 1.

The filter tank 1 is in fluid communication with an enclosed conduit 4, which also serves adjacent tanks (not shown). The conduit 4, as shown in FIG. 2 has two main fluid flow apertures 5, 6. The lower aperture 5 is for the liquid, in this case water, and the upper aperture 6 is for gas, in this case air.

A wall 10 of the tank 1 which separates the tank 1 from the conduit 4 also has fluid flow apertures 11, 12 connecting the tank 1 to the conduit 4, and enabling flow of air and water through the blocks 2. The blocks 2 are arranged in rows 13 (the first block only in each row being shown). Each row 13 is known as a lateral. Each row 13 has apertures 11, 12 in the wall 10. As shown, each lower aperture 11 is for water flow, and each upper aperture 12 is for air flow. Each upper aperture 12 is connected to a pipe 14 located in the conduit 4 and attached to the wall 10.

Each pair of apertures 11, 12 open into a chamber 15 in the tank 1, defined by an end plate 16 for a lateral 12. Each end plate 16 has sealant-receiving means 17 for sealing the end block 2 to the wall 7, and has aperture means 18 allowing flow of air and water between the chamber 15 and the block 2.

In normal use, the apparatus of FIGS. 1 and 2 has water fed to the top of the tank 1. The water filters down through the filter media, and is collected in the blocks 2, from where it flows through the aperture means 18, the chambers 15 and the lower apertures 11 into the conduit 4, and then out through the main aperture 5. The filter media needs periodic cleaning, which is achieved by a backwash operation. This will be described in more detail below, but involves air and water being pumped from the conduit 4 into the blocks 2, to release and remove the filtration solids from the filter media. The end plates 16 assist in ensuring that the backwash operation is efficient, and also make installation of the blocks 2 in the tank 1 easier.

An end plate 16 is shown in detail in FIGS. 3 to 7. It is of plastics material, and is a unitary member, advantageously being injection moulded. Each end plate 16 comprises primary and secondary members 20, 21 respectively. The primary member 20 is adapted for attachment to the end of the block 2, while the secondary member 21 is adapted for sealing to the wall 10, and defines the chamber 15.

Figure 3:
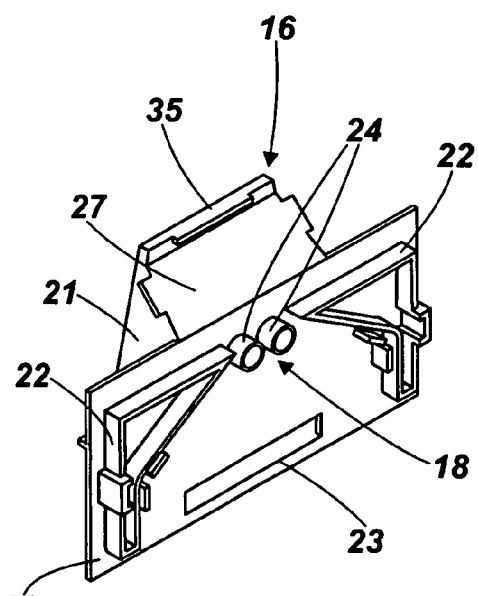
FIG. 3 shows a perspective view of one side of an end plate of the apparatus.
Figure 4:
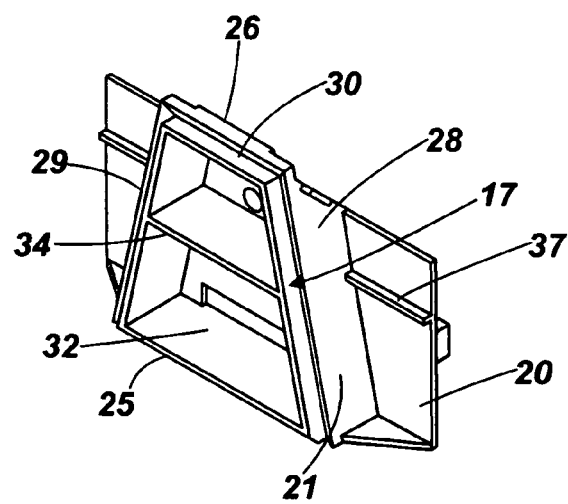
FIG. 4 is similar to FIG. 3, but shows the opposing side of the end plate.

FIG. 3 shows the primary member 20 in detail. It is of substantially rectangular outline, to correspond to the block 2, and has two projecting locating lugs 22, which are shaped to fit into the end of the block 2, and act to retain the end plate 16 in place on the block 2. The end plate 16 is also permanently attached to the block 2 by a sealing material or by welding, as appropriate. The primary member 20 also has the aperture means 18 in the form of fluid flow apertures 23, 24 for water and air respectively, and chosen to suit the particular block 2. The aperture 23 is for water, and comprises a rectangular slot provided near the base of the primary member. The aperture 24 is for air, and in this case is formed as two circular apertures near the top of the primary member 20. Each circular aperture is connected to a separate channel in the block 2.

FIGS. 4 to 7 show the secondary member 21 in more detail. It is of substantially trapezoidal outline, with the two parallel sides 25, 26 at the top and base. The side 25 at the base is the longer one, and is on substantially the same level as the bade of the primary member 20. The side 26 at the top is therefore the shorter one, and this projects above the top of the primary member 20, to which it is connected by an angled member 27. The free edge of the top side 26 and the two adjacent sides 28, 29 are formed with a channel 30 to receive a mastic-type sealant 31 (see FIG. 1) for sealing between the end plate 16 and the tank wall 10. The channel 30 can best be seen in FIG. 7.

The secondary member 21 has a base plate 32 along the side 25. The underside of the base plate 32 is provided with grout grips 33, so that the base plate 32 can be embedded firmly into the grout bed on which the blocks 2 rest. The base plate 32 then acts as a baffle to protect the water aperture 23 in the primary member 20 from ingress of grout.

The secondary member 21 also has an intermediate plate 34, parallel to the sides 25, 26, and between the water and air apertures 23, 24 in the primary member 20. The intermediate plate 34 then also acts as a baffle, separating the water and air apertures to assist fluid flow.

Further grout grips 35, 36 are provided on the secondary member 21, and 37 on the primary member 20. These engage with the grout round the edges of the tank wall 7.

Installation of the blocks 2 and end plates 16 will now be described, assuming that the tank 1 and conduit 4, with appropriate apertures 5, 6, 11, 12 are in place. The bed of grout 7 is laid on the floor 8 of the tank 1. The laterals 13 are formed by clipping adjacent blocks 2 together, and then attaching an end plate 16 at one end. Each lateral 13 is then placed at the top of the tank 1, and slides down the walls into place on the grout bed 7. A mastic-type sealant 31 is applied round the channel 30 of each end plate 16, to seal it against the wall 10. It will be appreciated that the shape of the secondary member 21 provides sufficient space for application of the sealant. When the end plate 16 is sealed to the wall 10, the further grout 9 can be introduced round the edge of the tank 1.

The end plates 16 make installation simple, as it is easy to make a reliable seal between the end plates 16 (and therefore the blocks 2) and the wall 10. The application of the grout 9 is also simple.

Following installation of the laterals 13, the filter media is introduced, and the apparatus can then operate in the usual way to filter water under gravity. As indicated previously, water to be filtered is introduced at the top of the tank 1, and moves down through the filter media, with the filtered water being collected in the blocks 2, and then flowing through the water aperture 23. The chamber 15 and the aperture 11 into the conduit 4, and out through the main aperture 5.

For a backwash operation, the feed to the top of the tank is stopped, and then air is pumped into the conduit 4, from where it flows through each pipe 14 and aperture 12 into the chamber 15 and then through the air apertures 24 into the blocks 2 for distribution over the filter media. It is then forced upwards through the filter media, which becomes fluidised, so that the air can release the filter solids from the media. As a next step, water and air are pumped concurrently into the conduit 4, and flow through their respective apertures 11, 12 into the chamber 15, and then through apertures 23, 24 into the blocks 2, which distribute the water and air over the filter media. The air continues the release of the solids, while the water causes the solids to move upwardly out of the filter media. The final step is to pump water alone from the conduit 4 through the water apertures 11, 23 into the blocks 2 and then to the filter media, to complete the removal of the solids from the filter media. The dirty water containing solids flows over the top of the tank wall 10 into a channel 40 provided over the top of the conduit 4.

The end plates 16 assist in ensuring that the backwash operation is performed efficiently. In particular, because the seal between the end plates 16 and the wall 10 is made reliably, there is very little air leakage into the tank 1, so that the air is largely directed to the blocks 2 for distribution.

FIGS. 8 and 9 shows an embodiment with modifications to the apparatus and the end plate 16, and corresponding reference numerals have been applied to corresponding parts.

In FIG. 8 the air aperture 12 in the wall 10 is not provided. Instead the pipe 14 has a U-shape, and is led through the aperture 11, with a return piece 50 provided in chamber 15 and attached to the wall 10. The top of the return piece 50 is at substantially the same level as the aperture 12 or FIG. 2.

In order to accommodate the return piece 50 the intermediate plate 34 of the secondary member 21 has a curved cut-out 51, and the base plate 32 is of reduced width. A further modification is the provision of a hole 52 in the top portion of the secondary member 21. This enables the end plate 16 to be secured to the wall 10 by a bolt or other suitable fastener. This assists in holding the end plate 16 in place for application of the sealant.

The construction and operation of the embodiment of FIGS. 8 and 9 is otherwise the same as those of FIGS. 1 to 7.

While the invention has been described with reference to several embodiments, it will be understood by those skilled in the art that various changes in form and detail may be made therein without departing from the spirit and scope of the invention.

The invention claimed is:

1. An end plate for a filter block of a water filtration apparatus, the water filtration apparatus having at least one tank, the tank being in fluid communication with a conduit, the tank being separated from the conduit by a wall, the wall having at least one aperture through which the tank and the conduit are in communication, the end plate providing aperture means for fluid flow into and out of the filter block, wherein the aperture means provides for gas and liquid flow into and out of the block, allowing filtered water to flow from the block to the conduit through the at least one aperture in the wall, and also allowing gas and liquid to pass from the conduit, through the at least one aperture in the wall, into the block during a backwash operation, the end plate including a primary member having a first side adapted to seal against a free end of the filter block, and means for receiving a second side having a channel extending at least partially around the aperture means to receive a sealant to provide a seal between the end plate and the wall.

2. The end plate as claimed in claim 1, wherein the primary member has the aperture means.

3. The end plate as claimed in claim 1, wherein separate the aperture means includes apertures for the gas and the liquid.

4. The end plate as claimed in claim 3, wherein the sizes of the apertures are chosen in accordance with fluid flow requirements, with the liquid aperture being below the gas aperture.

5. The end plate as claimed in claim 3, wherein the liquid aperture is a rectangular slot adjacent a base of the primary member, and the gas aperture is a pair of apertures adjacent a top of the primary member.

6. The end plate as claimed in claim 1, wherein the channel is provided on a secondary member projecting from the primary member on the second side, the second side opposite the first side.

7. The end plate as claimed in claim 6, wherein the channel is formed on the secondary member at an edge remote from the primary member.

8. The end plate as claimed in claim 6, wherein the secondary member is of trapezoidal outline, with the smaller parallel side at the top and the larger at the base, and the sealant channel is provided on the top and two adjacent sides.

9. The end plate as claimed in claim 6, wherein the secondary member has a flange projecting above the primary member.

10. The end plate as claimed in claim 9, wherein the flange is adapted to engage the wall, and has an aperture enabling a mechanical fastener to be used to locate the end plate on the wall.

11. The end plate as claimed in claim 6, wherein the secondary member also includes a base plate, adapted to engage with a bed of grout on which the filter block is installed.

12. The end plate as claimed in claim 11, wherein grout grips are provided on the base plate.

13. The end plate as claimed in claim 6, wherein the aperture means includes gas and liquid apertures, and wherein the secondary member has an intermediate plate forming a baffle separating the gas and liquid apertures on the primary member.

14. The end plate as claimed in claim 13, wherein the intermediate plate has a cut-out to allow the end plate to slide over a gas pipe projecting through the wall.

15. A water filtration apparatus having at least one tank in fluid communication with a conduit through at least one aperture in a wall, each tank having a filter medium resting on filter blocks such that filtered water passes through the blocks and into the conduit, wherein an end plate is provided for a filter block adjacent the wall, the end plate also providing aperture means for fluid flow into and out of the filter block, wherein the aperture means provides for gas and liquid flow into and out of the block, allowing filtered water to flow from the block to the conduit through the at least one aperture in the wall, and also allowing gas and liquid to pass from the conduit, through the at least one aperture in the wall, into the block during a backwash operation, the end plate including a primary member having a first side adapted to seal against a free end of the filter block, and a second side having a channel extending at least partially around the aperture means to receive a sealant to provide a seal between the end plate and the wall.

* * * * *